United States Patent
Huang et al.

(10) Patent No.: US 10,785,475 B2
(45) Date of Patent: Sep. 22, 2020

(54) METHOD AND APPARATUS OF VIDEO CODING WITH PREDICTION OFFSET

(71) Applicant: MEDIATEK SINGAPORE PTE. LTD., Singapore (SG)

(72) Inventors: Han Huang, Beijing (CN); Ching-Yeh Chen, Taipei (TW); Chih-Wei Hsu, Taipei (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 125 days.

(21) Appl. No.: 15/521,499

(22) PCT Filed: Nov. 4, 2015

(86) PCT No.: PCT/CN2015/093763
§ 371 (c)(1),
(2) Date: Apr. 24, 2017

(87) PCT Pub. No.: WO2016/070808
PCT Pub. Date: May 12, 2016

(65) Prior Publication Data
US 2017/0310958 A1    Oct. 26, 2017

(30) Foreign Application Priority Data

Nov. 5, 2014   (WO) ................ PCT/CN2014/090357
Apr. 17, 2015  (WO) ................ PCT/CN2015/076865

(51) Int. Cl.
*H04N 19/105*   (2014.01)
*H04N 19/176*   (2014.01)
(Continued)

(52) U.S. Cl.
CPC ......... *H04N 19/105* (2014.11); *H04N 19/139* (2014.11); *H04N 19/176* (2014.11);
(Continued)

(58) Field of Classification Search
CPC .. H04N 19/105; H04N 19/139; H04N 19/176; H04N 19/197; H04N 19/198; H04N 19/593; H04N 19/70
See application file for complete search history.

(56) References Cited

U.S. PATENT DOCUMENTS

2008/0232705 A1    9/2008  Sohn et al.
2009/0257500 A1*  10/2009  Karczewicz ......... H04N 19/176
                                          375/240.16
(Continued)

FOREIGN PATENT DOCUMENTS

CN    102714721 A    10/2012
CN    103379340 A    10/2013
(Continued)

OTHER PUBLICATIONS

Zhang et al. ("Non-SCE3 Inter-layer residual prediction with motion prediction"; Joint Collaborative Team on Video Coding of ITU-T SG 16 WP 3 and ISO/IEC JTC 1/SC 29/WG 11; Apr. 2013) (Year: 2013).*

(Continued)

*Primary Examiner* — Maria E Vazquez Colon
(74) *Attorney, Agent, or Firm* — Oblon, McClelland, Maier & Neustadt, L.L.P.

(57) ABSTRACT

A method and apparatus for video encoding and decoding with prediction offset in a video coding system are disclosed. A prediction offset for a current block is derived from a reconstructed residual signal of one or more coded blocks. At the encoder side, a residual signal for the current block is calculated by subtracting a prediction signal and the prediction offset from an original signal of the current block, and the residual signal is encoded to generate an encoded bitstream. At the decoder side, a residual signal for the current block is obtained from input data, a reconstructed signal for the current block is calculated by adding a (Continued)

prediction signal and the prediction offset to the residual signal, and the current block is decoded using the reconstructed signal.

19 Claims, 7 Drawing Sheets

(51) Int. Cl.
*H04N 19/196* (2014.01)
*H04N 19/139* (2014.01)
*H04N 19/593* (2014.01)
*H04N 19/70* (2014.01)

(52) U.S. Cl.
CPC ......... *H04N 19/197* (2014.11); *H04N 19/198* (2014.11); *H04N 19/593* (2014.11); *H04N 19/70* (2014.11)

(56) References Cited

U.S. PATENT DOCUMENTS

| | | | |
|---|---|---|---|
| 2012/0230405 A1* | 9/2012 | An | H04N 19/105 375/240.13 |
| 2012/0269263 A1 | 10/2012 | Bordes et al. | |
| 2014/0140416 A1* | 5/2014 | Yamazaki | H04N 19/463 375/240.25 |
| 2014/0286409 A1* | 9/2014 | Zhang | H04N 19/105 375/240.12 |

FOREIGN PATENT DOCUMENTS

| | | |
|---|---|---|
| EP | 2 613 536 A1 | 7/2013 |
| WO | WO 2014/146219 A1 | 9/2014 |

OTHER PUBLICATIONS

Zhang, W., et al.; "Non-SCE3 Inter-layer residual prediction with motion prediction;" Joint Collaborative Team on Video Coding (JCT-VC) of ITU-T SG 16 WP 3 and ISO/IEC JTC 1/SC 29/WG 11; Apr. 2013; pp. 1-4.

Yu, B., et al.; "Block-based second order prediction on AVS-part 2;" 28th Picture Coding Symposium, PCS2010; Dec. 2010; pp. 542-545.

International Search Report dated Jan. 27, 2016, issued in application No. PCT/CN2015/093763.

* cited by examiner

METHOD AND APPARATUS OF VIDEO CODING WITH PREDICTION OFFSET

CROSS REFERENCE TO RELATED APPLICATIONS

The present invention claims priority to PCT Patent Application Serial No. PCT/CN2014/090357, filed on Nov. 5, 2014, entitled "Merge with Inter Prediction Offset", and PCT Patent Application Serial No. PCT/CN2015/076865, filed on Apr. 17, 2015, entitled "Inter Prediction Offset". The PCT Patent Applications are hereby incorporated by reference in their entireties.

TECHNICAL FIELD

The present invention relates to image and video coding. In particular, the present invention relates to techniques to improve the efficiency of video coding with motion compensation using inter prediction offset.

BACKGROUND

Motion compensation prediction (MCP) is an effective inter-frame coding technique in video coding which exploits temporal redundancy in pictures of a video sequence. The motion compensation prediction technique is often applied in block-based configuration, where motion information such as motion vector (MV) and reference picture index is determined for each block. In addition to motion compensation prediction, intra prediction is another prediction technique to exploit spatial redundancy within a current picture. Depending on the mode selection, an inter predictor is generated from motion compensation prediction or an intra predictor is generated from intra prediction. A difference between an original signal and the inter predictor or the intra predictor is called prediction errors or a prediction residual signal. The prediction residual signal is further processed by transformation, quantization, and entropy coding to generate compressed video bitstream. During various stages in the encoding process, coding artifacts are introduced, particularly in the quantization process. In order to alleviate the coding artifacts, in-loop processing such as deblocking filter (DF) and sample adaptive offset (SAO) has been applied to reconstructed video to enhance picture quality.

Figure 1:
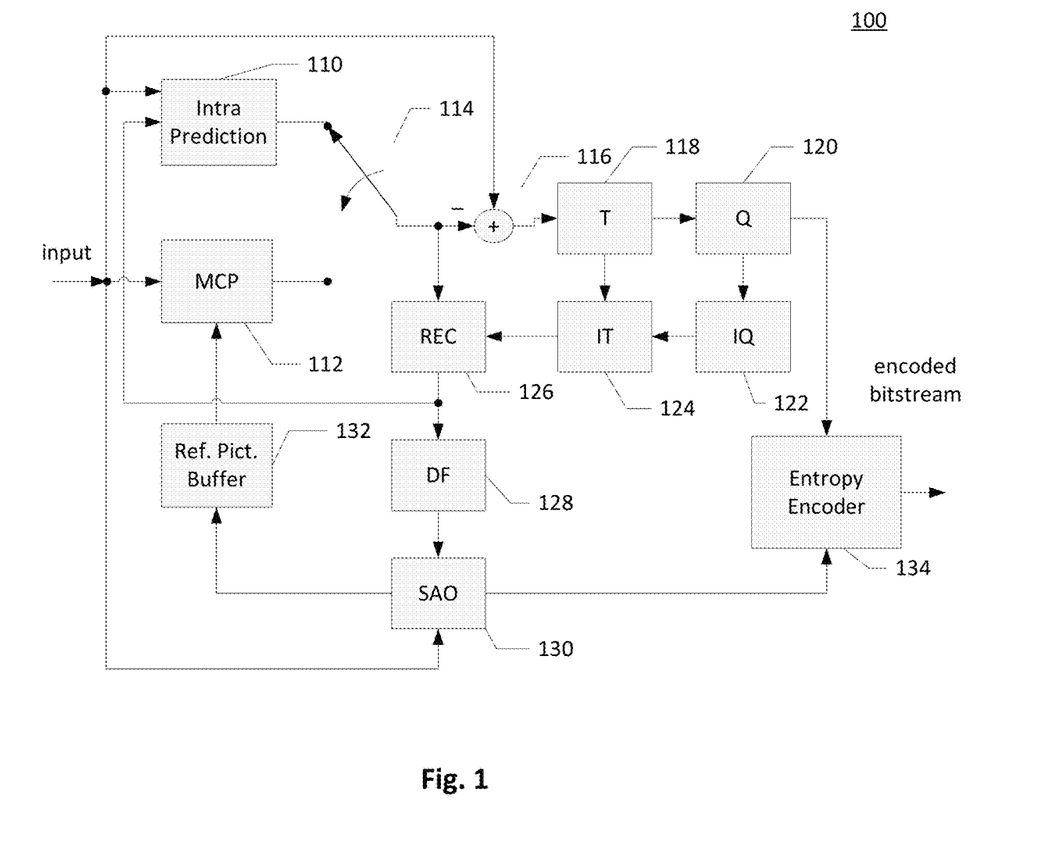
FIG. 1 illustrates an exemplary system block diagram for a video encoder based on High Efficiency Video Coding (HEVC) standard.

FIG. 1 illustrates an exemplary system block diagram for a Video Encoder 100 based on High Efficiency Video Coding (HEVC) with adaptive Inter and motion compensation prediction. Intra Prediction 110 provides intra predictor based on reconstructed video data of the current picture, whereas Motion Compensation Prediction (MCP) 112 performs motion estimation (ME) and motion compensation (MC) to provide inter predictor based on video data from other picture or pictures. Switch 114 selects one of the outputs from Intra Prediction 110 and Motion Compensation Prediction 112 and supplies the selected predictor to Adder 116 to form prediction errors, also called prediction residual signal. The prediction residual signal is further processed by Transformation (T) 118 followed by Quantization (Q) 120. The transformed and quantized residual signal is then coded by Entropy Encoder 134 to form an encoded video bitstream. The encoded video bitstream is then packed with side information such as motion information. The data associated with the side information are also provided to Entropy Encoder 134. When motion compensation prediction mode is used, a reference picture or pictures have to be reconstructed at the encoder end as well. The transformed and quantized residual signal is processed by Inverse Quantization (IQ) 122 and Inverse Transformation (IT) 124 to recover the prediction residual signal of the reference picture or pictures. As shown in FIG. 1, the prediction residual signal is recovered by adding back to the predictor at Reconstruction (REC) 126 to produce reconstructed video data. The reconstructed video data may be stored in Reference Picture Buffer (Ref. Pict. Buffer) 132 and used for prediction of other pictures.

The reconstructed video data from REC 126 may be subject to various impairments due to the encoding processing, consequently, in-loop processing Deblocking Filter (DF) 128 and Sample Adaptive Offset (SAO) 130 is applied to the reconstructed video data before storing in the Reference Picture Buffer 132 to further enhance picture quality. DF information from DF 128 and SAO information from SAO 130 are provided to Entropy Encoder 134 for incorporation into the encoded video bitstream.

Figure 2:
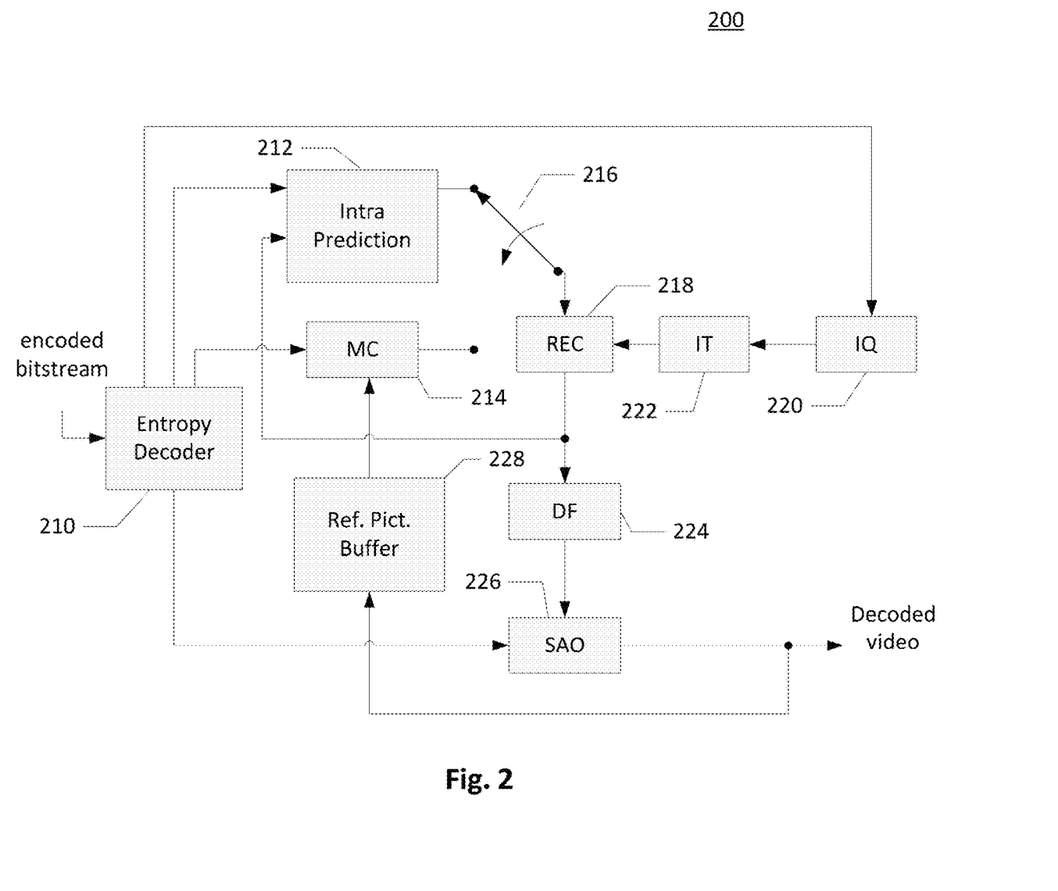
FIG. 2 illustrates an exemplary system block diagram for a video decoder based on HEVC standard.

A corresponding Decoder 200 for the Encoder 100 of FIG. 1 is shown in FIG. 2. The encoded video bitstream is decoded by Entropy Decoder 210 to recover the transformed and quantized residual signal, DF and SAO information, and other system information. The decoding process of Decoder 200 is similar to the reconstruction loop at the Encoder 100, except Decoder 200 only requires Motion Compensation (MC) 214 for motion compensation prediction. Switch 216 selects intra predictor from Intra Prediction 212 or inter predictor from MC 214 according to decoded mode information. The transformed and quantized residual signal is recovered by Inverse Quantization (IQ) 220 and Inverse Transformation (IT) 222. The recovered transformed and quantized residual signal is reconstructed by adding back the predictor in REC 218 to produce reconstructed video. The reconstructed video is further processed by DF 224 and SAO 226 to generate final decoded video. If the currently decoded picture is a reference picture, the reconstructed video of the currently decoded picture is also stored in Ref. Pict. Buffer 228.

In HEVC, two modes are allowed for motion compensation prediction, one is Advanced Motion Vector Prediction (AMVP) mode and another is merge mode. AMVP mode includes derivation of several most probable candidates based on data from adjacent prediction blocks and one or more reference picture. Merge mode allows the inheritance of motion vectors from temporally or spatially neighboring prediction blocks, therefore motion information is only signaled by a merge index. AMVP and merge modes transmit index information to select one out of several available candidates, in a manner sometimes referred to as a motion vector competition (MVC) scheme. At the decoder side, construction process of AMVP motion vector predictor (MVP) candidate list or Merge candidate list includes deriving spatial candidates and one temporal candidate. The candidate in the constructed candidate list referred by the decoded index is used to derive motion information. In Merge mode, the motion information inherited from the candidate includes motion vector(s) and reference picture index of the reference picture(s).

SUMMARY

A method and apparatus for video encoding and decoding with prediction offset in a video coding system are disclosed. Embodiments of video encoder according to the present invention receive input data associated with a current block in a current picture, derive a prediction offset for the current block from a reconstructed residual signal of one or more coded blocks, calculate a residual signal for the current block by subtracting a prediction signal and the prediction offset from an original signal of the current block, and encode the residual signal for the current block to generate an encoded bitstream. Embodiments of video decoder according to the present invention receive input data associated with a current block in a current picture, derive a residual signal for the current block from the input data, derive a prediction offset for the current block from a reconstructed residual signal of one or more coded blocks, calculate a reconstructed signal for the current block by adding a prediction signal and the prediction offset to the residual signal for the current block, and decode the current block using the reconstructed signal for the current block.

In some embodiments, the prediction offset is derived as a mean value or average value of the reconstructed residual signal of the coded block(s), and the mean value or average value of the reconstructed residual signal is pre-calculated and stored before the mean value or average value is used for deriving the prediction offset for the current block. If the coded block(s) is coded with prediction offset, the prediction offset for the current block is derived from the reconstructed residual signal of the coded block(s) and a prediction offset applied to the coded block(s). The coded block(s) is either a coding block (CB), a prediction block (PB), a 4×4 block, or a block with a predefined block size.

In yet another embodiment, the method further comprises selecting the coded block(s) from a plurality of candidate coded blocks by comparing with motion information of the current block. If a first motion vector and a first reference picture index of a first coded block equal to a current motion vector and a current reference picture index of the current block, the first coded block is selected to derive the prediction offset. In some embodiments, the prediction offset is derived from an average value or a mean value of the reconstructed residual signal of the coded blocks. When the prediction offset technique is applied to merge mode, the current block is coded using motion information of a merge candidate, the prediction signal is obtained by the motion information of the merge candidate, and the prediction offset for the current block is derived from the reconstructed residual signal of the merge candidate.

In some embodiments of the video encoder and decoder, the method further comprises determining a category of the current block, and the prediction offset is only derived and applied if the current block belongs to a predefined category. Otherwise the prediction offset technique is not applied, that is the residual signal for the current block is calculated by subtracting the prediction signal from the original signal of the current block at the encoder end, and the reconstructed signal for the current block is calculated by adding the prediction signal to the residual signal for the current block at the decoder end. The current block belongs to the predefined category if the current block is coded in merge mode, 2N×2N partition, luma component, or a combination thereof. In an embodiment, a syntax element is used to signal whether the prediction offset technique is applied. In yet another embodiment, the prediction offset is set to zero or a preset value if the prediction offset is not sufficiently reliable, for example, if the prediction offset is larger than a first threshold, if said one or more coded blocks is smaller than the current block, or if a variance of said one or more coded blocks is larger than a second threshold.

Other aspects and features of the invention will become apparent to those with ordinary skill in the art upon review of the following descriptions of specific embodiments.

DETAILED DESCRIPTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. In the following discussion and in the claims, the term "including" and "comprising" are used in an open-ended fashion, and thus should be interpreted to mean "including, but not limited to . . . ".

In order to improve the coding efficiency, a prediction offset for a current block is derived from one or more coded block and is used to calculate a residual signal. This prediction offset can also be described as a residual predictor, which is derived from the already coded block(s) to predict an original residual signal of the current block. By applying the prediction offset, the new residual signal of the current block computed at the encoder side becomes:

$$Resi_x = Orig_x - Pred_x - Offset_x \qquad (1)$$

where $Resi_x$ and $Orig_x$ are the residual signal and an original signal of the current block x respectively, and $Pred_x$ and $Offset_x$ are a prediction signal for the current block x and the prediction offset derived from the already coded block(s) for the current block x.

A reconstructed signal of the current block is computed at the decoder side by:

$$Reco_x = Resi'_x + Pred_x + Offset_x \qquad (2)$$

where $Reco_x$ and $Resi'_x$ are the reconstructed signal of the current block x and a reconstructed residual signal respectively.

The prediction offset is designed to predict the residual signal, which helps the encoder to further reduce absolute values of the final residual signal thereby reducing the number of bits required to encode the residual signal. The prediction offset technique may be applied to motion compensation prediction such as AMVP and merge mode in HEVC standard, so the prediction offset is referred as inter prediction offset. However, the prediction offset technique may also be applied to intra prediction, for example, a prediction offset is derived for an intra coded block in an inter frame to further reduce the bit required for encoding the residual signal.

First Embodiment

One or more coded blocks, preferably one or more neighboring coded blocks, are used to derive the prediction offset $Offset_x$. In this embodiment, the prediction offset $Offset_x$ for a current block x is derived as a mean value of a reconstructed residual signal of a coded block y:

$$Offset_x = mean(Resi'_y) \qquad (3)$$

where $Resi'_y$ is the reconstructed residual signal of the coded block y, and the coded block y is preferably a neighboring coded block located beside the current block x.

Second Embodiment

Figure 3A:
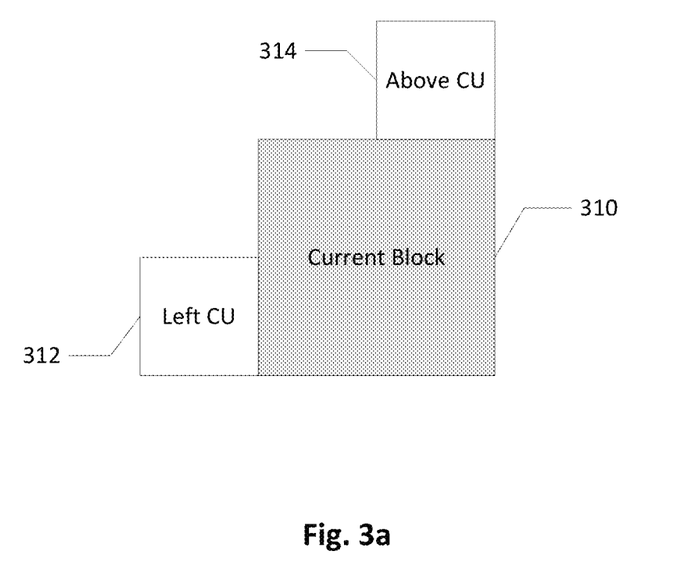
FIG. 3a illustrates an example of prediction offset derivation using coding unit (CU) level neighboring coded blocks.
Figure 3B:
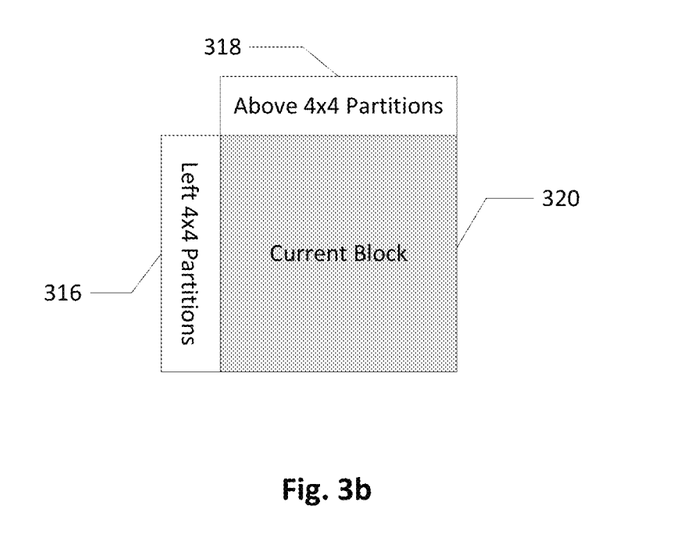
FIG. 3b illustrates an example of prediction offset derivation using 4×4 block level neighboring coded blocks.

The one or more coded blocks used for prediction offset derivation comprise a coding block (CB), a prediction block (PB), a transform block (TB), a 4×4 block, or a block with other predefined block sizes. In other words, the prediction offset can be derived in coding unit (CU) level, prediction unit (PU) level, transform unit (TU) level, or 4×4 block level. FIG. 3a illustrates an example of prediction offset derivation using CU level neighboring coded blocks. In this example, the prediction offset of a current block 310 is derived from a reconstructed residual signal of a left CU 312, a reconstructed residual signal of an above CU 314, or both the reconstructed residual signals of the left CU 312 and above CU 314. In an embodiment, the current block 310 is coded in merge mode, and if the current block 310 is merged to the left CU 312, the prediction offset for the current block 310 is calculated as the mean value (or the DC value) of the reconstructed residual signal of the left CU 312. If the current block 310 is merged to the above CU 314, the prediction offset for the current block 310 is calculated as the mean value of the reconstructed residual signal of the above CU 314. FIG. 3b illustrates an example of prediction offset derivation using 4×4 block level neighboring coded blocks. As shown in FIG. 3b, left 4×4 partitions 316 and above 4×4 partitions 318 are neighboring coded blocks of a current block 320. The prediction offset for the current block 320 in FIG. 3b is derived from a reconstructed residual signal of at least one left 4×4 neighboring block, a reconstructed residual signal of at least one above 4×4 neighboring block, or both. In an embodiment of merge mode, the reconstructed residual signals of all the left 4×4 partitions 316 are used to derive the prediction offset for the current block 320 when the current block 320 is merged to a left block, for example, an average of the mean value of the reconstructed residual signals of all the left 4×4 partitions 316 is calculated as the prediction offset for the current block 320. Alternatively, the reconstructed residual signals of all the above 4×4 partitions 318 are used when the current block 320 is merged to an above block, for example, an average of the mean value of the reconstructed residual signals of all the above 4×4 partitions 318 is calculated as the prediction offset for the current block 320. In another embodiment of merge mode, the reconstructed residual signals of one or more 4×4 partitions among the left 4×4 partitions 316 located at specific positions are used to derive the prediction offset for the current block 320 when the current block 320 is merged to a left block, and the reconstructed residual signals of one or more 4×4 partitions among the above 4×4 partitions 318 located at specific positions are used when the current block 320 is merged to an above block.

Third Embodiment

In this embodiment, the coded block(s) used to derive the prediction offset is selected by comparing motion information of the coded block(s) with motion information of the current block. For example, if a first coded block has a first motion vector and a first reference picture index equal to a current motion vector and a current reference picture index of the current block, the first coded block is used to derive the prediction offset for the current block.

Figure 4A:
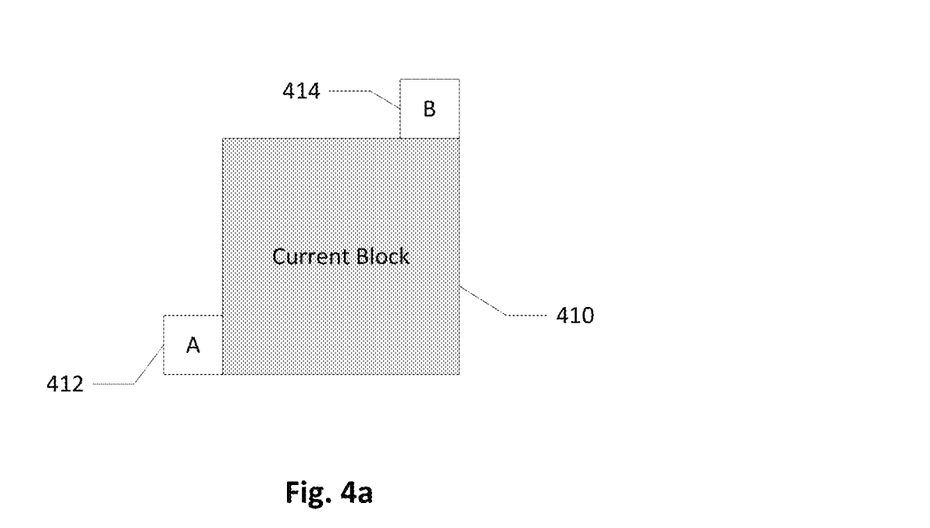
FIGS. 4a and 4b Illustrate two exemplary prediction offset derivation methods.
Figure 4B:
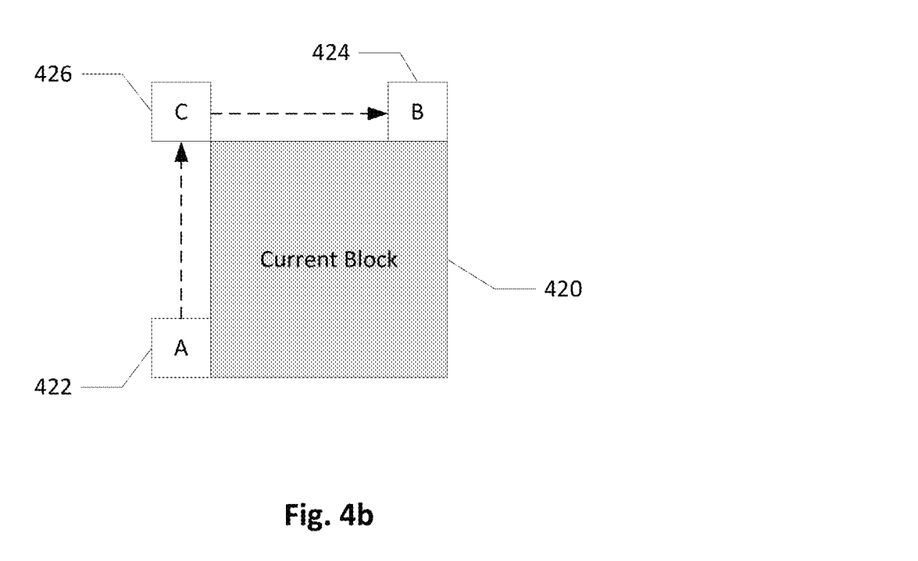

The third embodiment can be further illustrated by two exemplary prediction offset derivation methods as shown in FIG. 4a and FIG. 4b. In FIG. 4a, motion information of neighboring block A 412 and motion information of neighboring block B 414 are obtained to compare with motion information of the current block 410. Block A 412 and block B 414 can be a left 4×4 block and an above 4×4 block located adjacent to the left boundary and the top boundary of the current block 410 respectively. The prediction offset for the current block 410 is calculated using both reconstructed residual signals of block A 412 and block B 414 if both the motion information of block A 412 and block B 414 matches the motion information of the current block 410. For example, an average of the mean value of the reconstructed residual signal from block A 412 and the mean value of the reconstructed residual signal from block B 414 is calculated as the prediction offset for the current block 410. If only the motion information of block A 412 matches the motion information of the current block 410, the prediction offset for the current block 410 is derived from the reconstructed residual signal of block A 412. Similarly, if the motion information of block B 414 matches the motion information of the current block 410, the prediction offset for the current block 410 is derived from the reconstructed residual signal of block B. The two pieces of motion information are matched when the motion vectors, reference picture indices, or both the motion vectors and reference picture indices are the same or the difference is within a predefined threshold. The following pseudo codes describe an example of the prediction offset derivation discussed above.

```
If MV_curr == MV_A && MV_curr == MV_B
    offset = (DC_A + DC_B) >> 1
Else if MV_curr == MV_A
    offset = DC_A
Else if MV_curr == MV_B
    offset = DC_B
Else
    offset = 0
``` where MV_curr represents the motion vector of the current block 410, MV_A represents the motion vector of block A 412, MV_B represents the motion vector of block B 414, DC_A represents the mean value of the reconstructed residual signal of block A 412, DC_B represents the mean value of the reconstructed residual signal of block B 414, and offset is the prediction offset for the current block 410.

In FIG. 4b, the coded blocks for deriving the prediction offset for a current block 420 are chosen from block A 422 to block C 426 to block B 424. Any neighboring coded block having matched motion information with the current block 420 is used to calculate the prediction offset for the current block 420. The prediction offset calculation is described as follows:

```
FOR i = A : B
    IF MV_curr == MV_i
        offset += DC_i
        count ++
    END IF
END FOR
offset = offset / count
``` where MV_i represents a motion vector of a neighboring coded block i, DC_i represents the mean value of the residual signal of block i. Block i is any block between block A 422 and block B 424, including block C 426. In general, the prediction offset is more robust when it is derived from averaging over multiple coded blocks instead of from a single coded block. In order to reduce the implementation complexity, a lookup table can be used to replace the dividing operation. In FIGS. 4a and 4b, the neighboring coded blocks A, B and C are 4×4 blocks or any other predefined block sizes.

Fourth Embodiment

In this embodiment, if a prediction offset $Offset_y$ is already applied to the coded block y used to derive a prediction offset $Offset_x$ for the current block x, the prediction offset $Offset_x$ for the current block x is calculated by the reconstructed residual signal of the coded block y and the prediction offset $Offset_y$ for the coded block y.

$$Offset_x = mean(Resi'_y) + Offset_y \quad (4)$$

In other words, the prediction offset $Offset_x$ is updated by adding the most recently calculated prediction offset, mean $(Resi'_y)$, with a previous prediction offset $Offset_y$. The prediction offset can be calculated in CU level, PU level, TU level, or 4×4 block level.

Fifth Embodiment

In an embodiment, the mean value of the reconstructed residual signal of the coded block is pre-calculated and stored before the mean value is used for deriving the prediction offset for the current block. For example, when a residual signal of a neighboring block y is reconstructed, the mean value of the residual signal is immediately obtained and stored in a buffer. For example, for deriving a 4×4 block based prediction offset, the mean values (or DC values) of the 4×4 partitions at the four bottom rows and the four right column of a coded block are computed and stored. These stored mean values can be used to calculate the prediction offset for subsequent blocks in encoding order.

Sixth Embodiment

Figure 5:
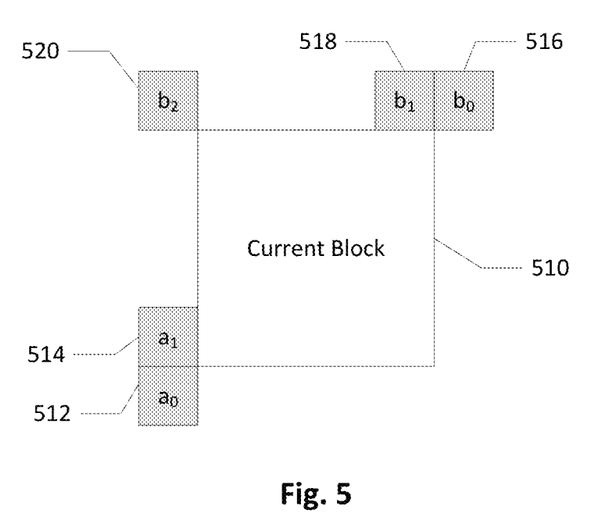
FIG. 5 illustrates positions of spatial merge candidates for a current block defined by the HEVC standard.

The current block is encoded in merge mode according to the sixth embodiment. The coded block(s) used to derive the prediction offset is the same as the merge candidate selected in the merge mode. FIG. 5 illustrates positions of spatial merge candidates $a_0$, $a_1$, $b_0$, $b_1$ and $b_2$ for a current block defined in the HEVC standard. If the current block 510 is merged to a spatial neighboring coded block $b_2$ 520, the mean value of the residual signal in the merge candidate $b_2$ 520 is used to calculate the prediction offset for the current block 510. In this embodiment, the prediction offset and the motion information of the current block 510 are all derived from the merge candidate $b_2$ 520. The motion information of the merge candidate is used for motion compensation and the residual signal of the merge candidate is used for prediction offset derivation. In one embodiment, if the merge candidate $b_2$ 520 is also coded in merge mode, the prediction offset for the current block 510 is derived using both the residual signal and the prediction offset for the merge candidate $b_2$ 520 according to Equation (4), where $Offset_x$ is the prediction offset for the current block 510, $mean(Resi'_y)$ represents the mean of the residual signal of merge candidate $b_2$ 520, and $Offset_y$ represents the prediction offset for the merge candidate $b_2$ 520.

Seventh Embodiment

In the seventh embodiment, the encoder adaptively applies the prediction offset technique according to a criterion. For example, the encoder determines a category and only if the current block belongs to a predefined category, the prediction offset technique is applied to the current block; otherwise, the prediction offset technique is not applied to the current block. The residual signal is calculated based on a prediction offset, an original signal, and a prediction signal when the prediction offset technique is applied, whereas the residual signal is calculated only based on the difference between the original signal and the prediction signal when the prediction offset technique is not applied. The decoder can also implicitly determine whether the prediction offset technique is applied according to the same criterion as the encoder. In an embodiment, the predefined category is the luma component (Y component) for YUV or YCbCr video format; whereas the prediction offset technique is applied in all components for RGB, YUV, or YCbCr video format according to another embodiment. An exemplary predefined category is merge mode, where the prediction offset technique is constrained to apply for merge mode only. Another exemplary predefined category is a predetermined partition size, where the prediction offset technique is constrained to apply for blocks with the predetermined partition size. For example, the predetermined partition size is 2N×2N. In an embodiment, the predefined category is merge 2N×2N mode, where the prediction offset technique is only applied to blocks coded in merge 2N×2N mode. In another embodiment, the encoder and decoder determine whether the prediction offset technique is applied according to statistics of mode selections.

Eighth Embodiment

In this embodiment, one or more syntax element is explicitly transmitted in an encoded video bitstream to signal whether the prediction offset technique is used. The syntax element can be coded and incorporated in the video bitstream. For example, the syntax element is transmitted in a sequence level, view level, picture level, slice level, block level, or other levels by incorporating in Sequence Parameter Set (SPS), View Parameter Set (VPS), Picture Parameter Set (PPS), Adaptive Parameter Set (APS), slice header, Largest Coding Unit (LCU). The decoder receives the syntax element from the video bitstream and adaptively applies the prediction offset technique according to the syntax element.

Ninth Embodiment

In the ninth embodiment, the prediction offset is set to zero or a preset value based on one or more predefined criterion. For example, the prediction offset is set to zero or a preset value if a derived prediction offset is larger than a first threshold. Another example is to compare the block size of the current block and the coded block used to derive the prediction offset, if the coded block is smaller than the current block, the prediction offset is set to zero or a preset value. In yet another example, a variance of the coded block is computed to determine whether the prediction offset is set to zero. For example, if the variance of the coded block is larger than a second threshold, the prediction offset is set to zero. The reason for setting the prediction offset to zero or a preset value according to the predefined criterion is to eliminate using the residual signal that is not a good predictor to predict the prediction offset for the current block.

Figure 6:
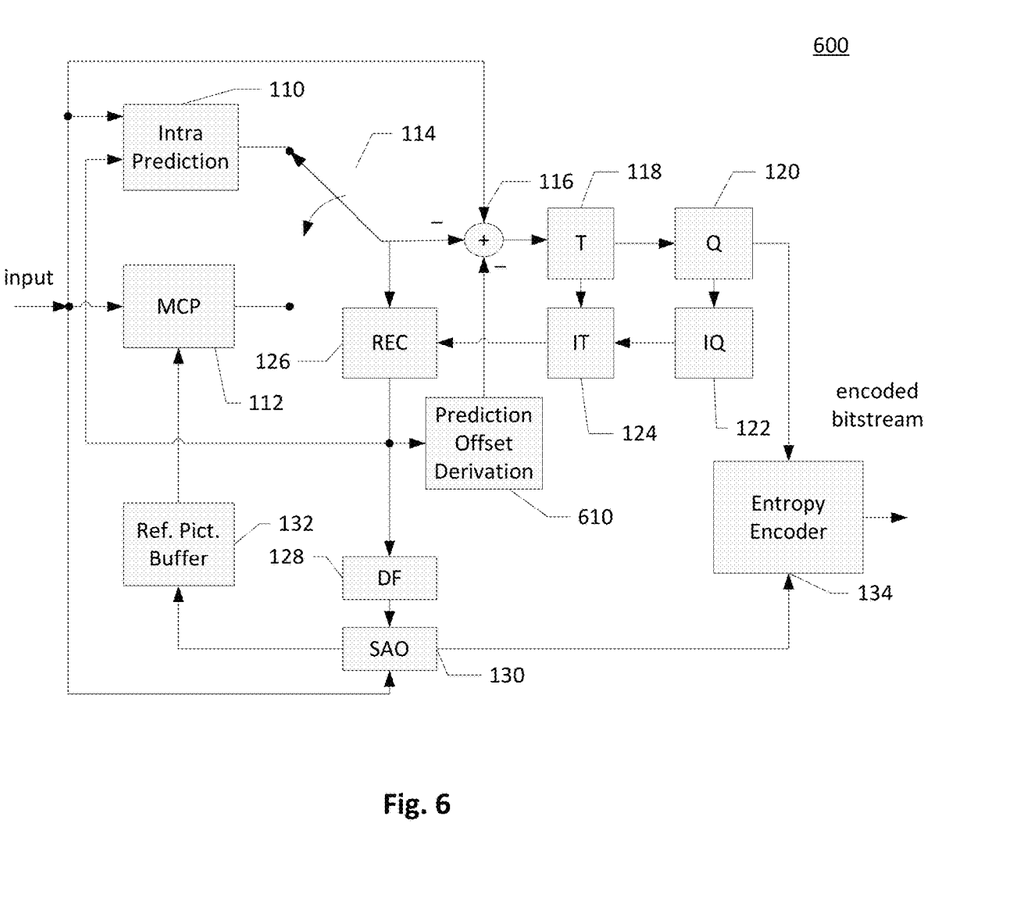
FIG. 6 illustrates an exemplary system block diagram for a video encoder with prediction offset according to an embodiment of the invention.

FIG. 6 illustrates a system block diagram for a video encoder 600 embodying the prediction offset technique. Most of the functional blocks in FIG. 6 are identical to the function blocks described in FIG. 1 and descriptions relevant to these functional blocks are therefore omitted. In FIG. 6, Prediction Offset Derivation 610 receives a reconstructed residual signal of one or more coded blocks from Reconstruction (REC) 126 to derive a prediction offset for a current block. An example of prediction offset derivation is to calculate the mean value of the reconstructed residual signal of the coded block. The prediction offset derived from the Prediction Offset Derivation 610 is supplied to the Adder 116. The Adder 116 generates residual signal by subtracting both a predictor and the prediction offset from an original signal. The predictor is an output of the Switch 114, the Switch 114 receives predictors from Intra Prediction 110 and Motion Compensation Prediction (MCP) 112. In an embodiment, the prediction offset technique is only applied to Inter prediction, for example, only applied to the merge mode, the Adder 116 generates the residual signal based on the predictor and the prediction offset when the current block is coded in merge mode. Otherwise, the Adder generates the residual by subtracting the predictor from the original signal when the current block is coded in other modes such as intra and AMVP modes. The residual signal is further processed by Transformation (T) 118 and Quantization (Q) 120 before encoded into a video bitstream in the Entropy Encoder 134.

Figure 7:
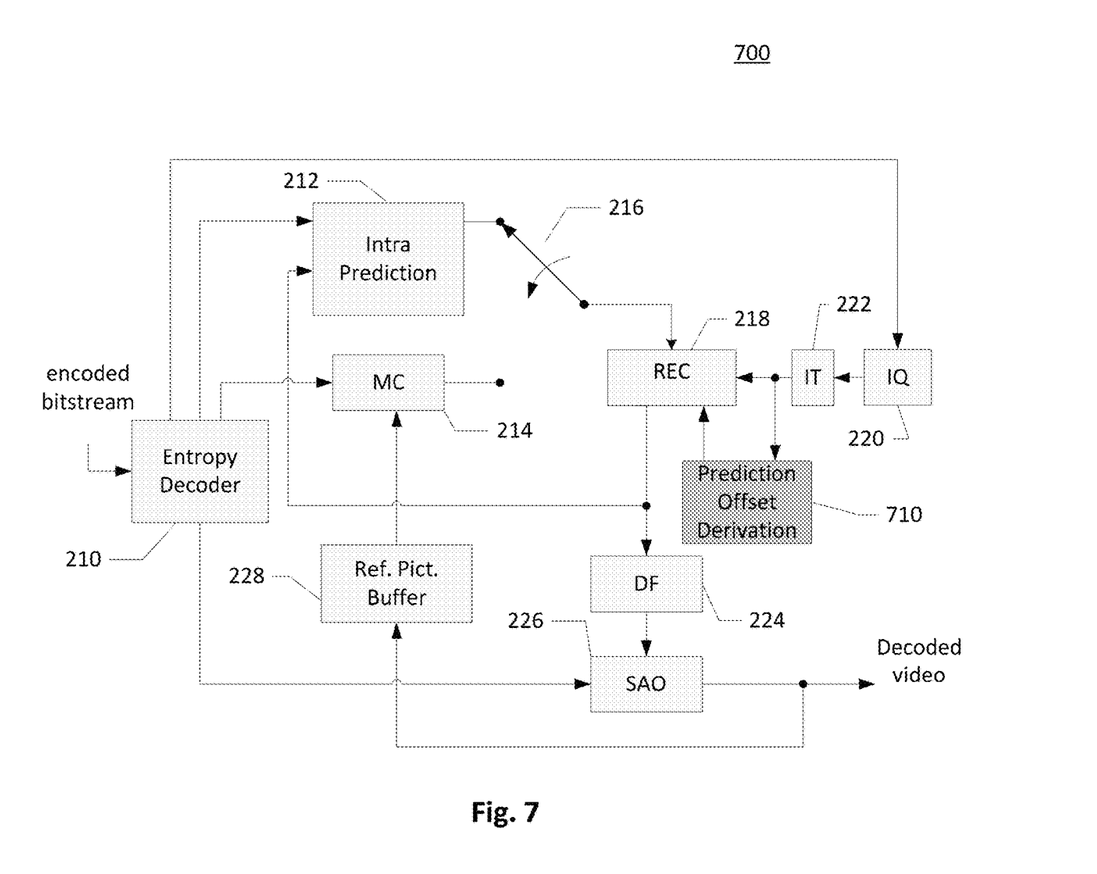
FIG. 7 illustrates an exemplary system block diagram for a video decoder with prediction offset according to an embodiment of the invention.

FIG. 7 illustrates a system block diagram of a video decoder 700 embodying the prediction offset technique. Similarly, most functional blocks of FIG. 7 are the same as the corresponding function blocks discussed in FIG. 2. Reconstruction (REC) 218 generates a reconstructed signal for a current block by adding a predictor, a reconstructed residual signal and a prediction offset. The predictor is an output of the Switch 216 selecting from the output of Intra Prediction 212 and Motion Compensation (MC) 214. The reconstructed residual signal is received from Inverse Transformation (IT) 222. The prediction offset is calculated by Prediction Offset Derivation 710 and supplied to REC 218 to derive the residual signal when the prediction offset technique is applied. The Prediction Offset Derivation 710 calculates the prediction offset for a current block based on reconstructed residual signal of one or more coded blocks received from IT 222.

Although the first embodiment to the ninth embodiment of video coding method with prediction offset are described, the invention is not limited to these embodiments. In each embodiment, the choice of the video coding method with prediction offset is an example to illustrate various embodiments and should not be understood as a restriction or a requirement for any embodiment of the invention. The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of encoding video data in a video coding system, comprising:
   receiving input data associated with a current block in a current picture, the current block being coded according to a merge mode using motion information of a merge candidate;
   deriving a prediction offset for the current block from a reconstructed residual signal of the merge candidate that is spatially adjacent to the current block;
   calculating a residual signal for the current block by subtracting a prediction signal obtained according to the motion information of the merge candidate and the prediction offset from an original signal of the current block; and
   encoding the residual signal for the current block to generate an encoded bitstream.

2. The method of claim 1, wherein the prediction offset is derived as a mean value of the reconstructed residual signal of the merge candidate.

3. The method of claim 2, wherein the mean value of the reconstructed residual signal of the merge candidate is pre-calculated and stored before the mean value is used for deriving the prediction offset for the current block.

4. The method of claim 1, wherein the merge candidate corresponds to a coding block, a prediction block, a 4×4 block, or a block with a predefined block size.

5. The method of claim 1, further comprising selecting the merge candidate from a plurality of candidate coded blocks by comparing motion information of the candidate coded blocks with motion information of the current block.

6. The method of claim 5, wherein the merge candidate selected from the candidate coded blocks has a candidate motion vector and a candidate reference picture index same as a current motion vector and a current reference picture index of the current block.

7. The method of claim 1, further comprising:
   deriving and applying the prediction offset in a case that the current block belongs to a predefined category; and
   calculating the residual signal for the current block by subtracting only the prediction signal from the original signal of the current block in a case that the current block does not belong to the predefined category,
   wherein the current block belongs to the predefined category if the current block is a luma component, a predetermined partition size, coded in merge mode, or a combination thereof.

8. The method of claim 1, further comprising incorporating a syntax element to explicitly signal whether the prediction offset is applied.

9. The method of claim 1, further comprising:
   setting the prediction offset to zero or a preset value if the derived prediction offset is larger than a first threshold, if the merge candidate is smaller than the current block, or if a variance of the merge candidate is larger than a second threshold.

10. A method of decoding a video bitstream in a video coding system, comprising:
    receiving input data associated with a current block in a current picture, the current block being coded according to a merge mode using motion information of a merge candidate;
    obtaining a residual signal for the current block from the input data;
    deriving a prediction offset for the current block from a reconstructed residual signal of the merge candidate that is spatially adjacent to the current block;
    calculating a reconstructed signal for the current block by adding a prediction signal obtained according to the motion information of the merge candidate and the prediction offset to the residual signal for the current block; and
    decoding the current block using the reconstructed signal for the current block.

11. The method of claim 10, wherein the prediction offset is derived as a mean value of the reconstructed residual signal of the merge candidate.

12. The method of claim 11, wherein the mean value of the reconstructed residual signal of the merge candidate is pre-calculated and stored before the mean value is used for deriving the prediction offset for the current block.

13. The method of claim 10, wherein the merge candidate corresponds to a coding block, a prediction block, a 4×4 block, or a block with a predefined block size.

14. The method of claim 10, further comprising selecting the merge candidate from a plurality of candidate coded blocks.

15. The method of claim 14, wherein the merge candidate selected from the candidate coded bocks has a candidate motion vector and a candidate reference picture index same as a current motion vector and a current reference picture index of the current block.

16. The method of claim 10, further comprising:
    deriving and applying the prediction offset in a case that the current block belongs to a predefined category; and
    calculating the reconstructed signal for the current block by only adding the prediction signal to the residual signal for the current block in a case that the current block does not belong to the predefined category,
    wherein the current block belongs to the predefined category if the current block is a luma component, a predetermined partition size, coded in merge mode, or a combination thereof.

17. The method of claim 10, further comprising retrieving a syntax element from the input data to determine whether the prediction offset is applied.

18. The method of claim 10, further comprising:
    setting the prediction offset to zero or a preset value if the derived prediction offset is larger than a first threshold, if the merge candidate is smaller than the current block, or if a variance of the merge candidate is larger than a second threshold.

19. An apparatus of decoding a video bitstream, the apparatus comprising:
    processing circuitry configured to:
      receive input data associated with a current block in a current picture, the current block being coded according to a merge mode using motion information of a merge candidate;
      obtain a residual signal for the current block from the input data;
      derive a prediction offset for the current block from a reconstructed residual signal of the merge candidate that is spatially adjacent to the current block;
      calculate a reconstructed signal for the current block by adding a prediction signal obtained according to the motion information of the merge candidate and the prediction offset to the residual signal for the current block; and
      decode the current block using the reconstructed signal for the current block.

* * * * *